United States Patent
Yamaguchi et al.

(10) Patent No.: US 7,679,705 B2
(45) Date of Patent: Mar. 16, 2010

(54) LIQUID CRYSTAL DISPLAY DEVICE

(75) Inventors: Takeshi Yamaguchi, Kumagaya (JP); Kisako Ninomiya, Fukaya (JP); Yasushi Kawata, Ageo (JP); Yuuzo Hisatake, Fukaya (JP); Akio Murayama, Fukaya (JP); Norihiro Yoshida, Fukaya (JP); Chigusa Tago, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 467 days.

(21) Appl. No.: 11/466,230

(22) Filed: Aug. 22, 2006

(65) Prior Publication Data

US 2007/0046886 A1    Mar. 1, 2007

(30) Foreign Application Priority Data

Aug. 26, 2005    (JP) ............................ 2005-245921

(51) Int. Cl.
G02F 1/1337    (2006.01)
(52) U.S. Cl. ....................... 349/129; 349/114
(58) Field of Classification Search ........................ None
See application file for complete search history.

(56) References Cited

U.S. PATENT DOCUMENTS 7,046,322 B2 *    5/2006    Tsuchiya .................... 349/114
7,248,321 B2 *    7/2007    Higa ........................... 349/129
2004/0207788 A1    10/2004    Yamaguchi et al.

FOREIGN PATENT DOCUMENTS

JP    2004-54129    2/2004

OTHER PUBLICATIONS

U.S. Appl. No. 12/028,526, filed Feb. 8, 2008, Yoshida, et al.
U.S. Appl. No. 11/461,197, filed Jul. 31, 2006, Yoshida, et al.
U.S. Appl. No. 11/464,937, filed Aug. 16, 2006, Ninomiya, et al.
U.S. Appl. No. 11/668,238, filed Jan. 29, 2007, Yoshida et al.
U.S. Appl. No. 11/673,168, filed Feb. 9, 2007, Hirosawa, et al.
U.S. Appl. No. 12/327,433, filed Dec. 3, 2008, Yoshida, et al.

* cited by examiner

Primary Examiner—Richard H Kim
(74) Attorney, Agent, or Firm—Oblon, Spivak, McClelland, Maier & Neustadt, L.L.P.

(57) ABSTRACT

A liquid crystal display device includes an array substrate and a counter-substrate, a liquid crystal layer which is held between the array substrate and counter-substrate and includes a transmissive display part and a reflective display part which neighbor each other via a boundary, an alignment state of liquid crystal molecules in the liquid crystal layer being controlled by an application voltage from the array substrate and counter-substrate in the transmissive display part and the reflective display part, and control means for making an alignment direction of the liquid crystal molecules, which are present near the boundary in the reflective display part, substantially match an alignment direction of the liquid crystal molecules which are present near the boundary in the transmissive display part.

7 Claims, 6 Drawing Sheets

|  | Transmittance | Uniformity in alignment division | Response time *) | Afterimage |
|---|---|---|---|---|
| Example 1 | 18% | Good | 20ms | None |
| Example 2 | 17% | Good | 25ms | Slight |
| Example 3 | 15% | Good | 18ms | None |
| Example 4 | 17% | Good | 17ms | None |
| Example 5 | 18% | Good | 20ms | None |

*) Sum of time, during which luminance changes from 10% to 90% when minimum gray level is switched to maximum gray level, and time during which luminance changes from 90% to 10% when maximum gray level is switched to minimum gray level

F I G. 10

LIQUID CRYSTAL DISPLAY DEVICE

CROSS-REFERENCE TO RELATED APPLICATIONS

This application is based upon and claims the benefit of priority from prior Japanese Patent Application No. 2005-245921, filed Aug. 26, 2005, the entire contents of which are incorporated herein by reference.

BACKGROUND OF THE INVENTION

1. Field of the Invention

The present invention relates generally to a liquid crystal display device, and more particularly to a transflective liquid crystal display device having a reflective display region and a transmissive display region.

2. Description of the Related Art

A display device using a liquid crystal element is not self-luminous, unlike a CRT (Cathode-Ray Tube) or an EL (Electroluminescence) device. As a liquid crystal display device which enables luminous display, there is known a transmissive liquid crystal display device, wherein a backlight is disposed on the back side of the liquid crystal element and the backlight illuminates the back side of the liquid crystal element. In usual cases, however, the backlight consumes more than 50% of the total power which is consumed by the liquid crystal display device. As a liquid crystal display device which can reduce power consumption, there is known a reflective liquid crystal display device, which effects luminous display by using only ambient light, and this reflective liquid crystal display device has been applied to mobile information devices which are, in usual cases, used outdoors or carried by users. A drawback of the reflective liquid crystal display device is that when ambient light is dark, reflective light for effecting display decreases and the visibility considerably deteriorates. On the other hand, the transmissive liquid crystal display device has such a drawback that the visibility deteriorates when ambient light is very bright, for example, in fine weather.

To solve these problems, there is known a transflective liquid crystal display device wherein a reflective display part and a transmissive display part are separately provided in each of pixels.

In a dark place, the transflective liquid crystal display device functions as a transmissive liquid crystal display device which displays an image by selectively passing backlight through the transmissive display part in each pixel. In a light place, the transflective liquid crystal display device functions as a reflective liquid crystal display device which displays an image by selectively reflecting ambient light by means of the reflective display part in each of the pixels. Thereby, power consumption can greatly be reduced.

Various liquid crystal display methods are applicable to the liquid crystal display device, if a variation in liquid crystal alignment is utilized in such methods. For example, a TN (twisted nematic) mode and a STN (super-twisted nematic) mode, in which polarizers are used, are adopted in reflective liquid crystal display devices. In recent years, a phase-transition guest-host (GH) mode, which can realize bright display since no polarizer plate is used, has been developed.

In a multi-domain VAN (Vertical Alignment Nematic) (MVA) mode, liquid crystal molecules in the vicinity of the surface of an alignment film are vertically aligned by adopting a vertical alignment treatment, and the birefringence index of the liquid crystal layer becomes substantially zero. Thus, black of an adequate level can be displayed and a high contrast can be obtained. In addition, the design for compensating a viewing angle is relatively easy, and a wide viewing angle can be realized. Furthermore, a rubbing alignment treatment process, which has conventionally been considered to be a possible cause of defects, such as electrostatic discharge damage, can be dispensed with. Therefore, the MVA mode has attracted particular attention in these years.

However, if the MVA mode is applied to the transflective liquid crystal display device, the direction of electric field, which is applied to the liquid crystal layer, and the elastic energy due to the interface shape become complex. It is thus difficult to obtain fixed guidelines relating to the alignment state of liquid crystal molecules in association with the arrangement of ridge-like projections and slits. In some cases, the arrangement of liquid crystal molecules may be disturbed in each domain, and it is difficult to stably form a plurality of domains in one pixel.

The present invention has been made in consideration of the above-described problems, and the object of the invention is to provide a liquid crystal display device which can have wide viewing-angle characteristics by virtue of stable domain division, can suppress a decrease in light transmissivity due to, e.g. disturbance of the alignment direction of liquid crystal molecules, and can perform transmissive display and reflective display with high display quality.

BRIEF SUMMARY OF THE INVENTION

According to an aspect of the present invention, there is provided a liquid crystal display device comprising: first and second electrode substrates; a liquid crystal layer which is held between the first and second electrode substrates, and includes a transmissive display part and a reflective display part which neighbor each other via a boundary, an alignment state of liquid crystal molecules in the liquid crystal layer being controlled by an application voltage from the first and second electrode substrates in the transmissive display part and the reflective display part; and control means for making an alignment direction of the liquid crystal molecules, which are present near the boundary in the reflective display part, substantially match an alignment direction of the liquid crystal molecules which are present near the boundary in the transmissive display part.

The invention can provide a liquid crystal display device which has wide viewing-angle characteristics by virtue of stable domain division, can suppress a decrease in light transmissivity due to, e.g. disturbance of the alignment direction of liquid crystal molecules, and can perform transmissive display and reflective display with high display quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to an embodiment of the present invention will now be described with reference to the accompanying drawings. The liquid crystal display device according to the embodiment, for instance, an active-matrix liquid crystal display device, includes a liquid crystal display panel 100.

Figure 1:
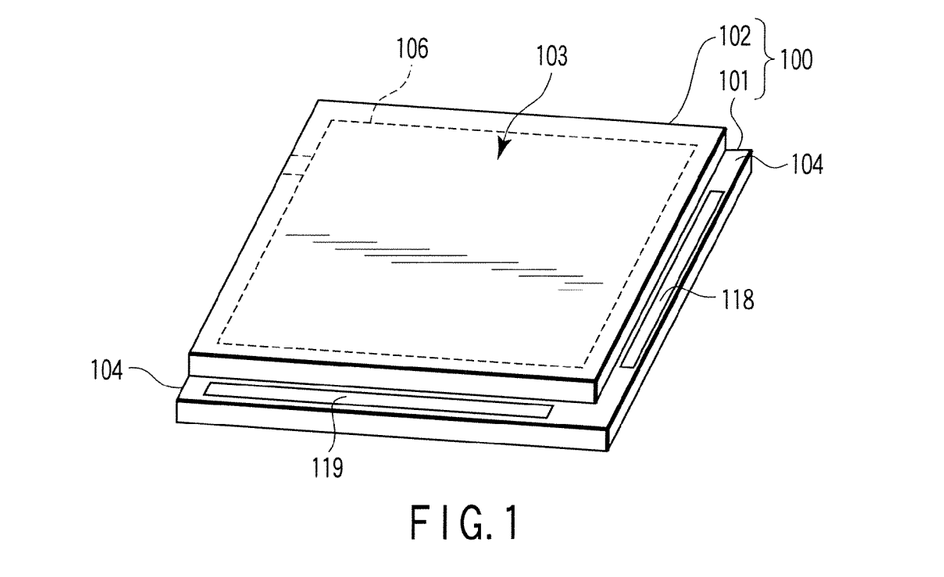
FIG. 1 schematically shows an example of the structure of a liquid crystal display panel which is included in a liquid crystal display device according to an embodiment of the present invention.

The liquid crystal display panel 100, as shown in FIG. 1, includes an array substrate 101, a counter-substrate 102 which is opposed to the array substrate 101, and a liquid crystal layer 190 which is held between the array substrate 101 and counter-substrate 102. In the liquid crystal display panel 100, a display region 103, which displays an image, is formed within a region surrounded by an outer peripheral seal member 106 by which the array substrate 101 and counter-substrate 102 are attached. A peripheral region 104, which is provided around the display region 103, includes a light-blocking region 141 which is formed in a picture-frame shape on the outside of the outer peripheral seal member 106.

Figure 2:
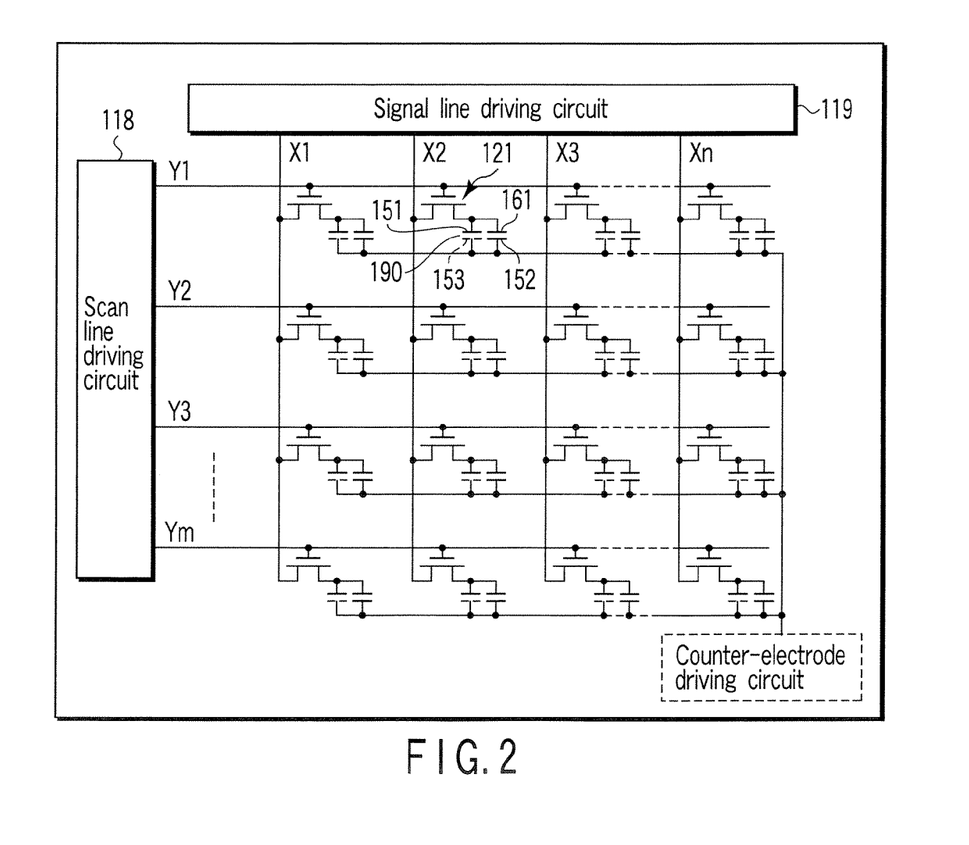
FIG. 2 is a view for describing the example of the structure of the liquid crystal display panel shown in FIG. 1.

In the display region 103, the array substrate 101, as shown in FIG. 2, includes an (m×n) number of matrix-arrayed pixel electrodes 151, an m-number of scan lines Y1 to Ym which are formed in a row direction of the pixel electrodes 151, an n-number of signal lines X1 to Xn which are formed in a column direction of the pixel electrodes 151, and n (m×n) number of thin-film transistors, that is, pixel TFTs 121, which are disposed as switching elements near intersections of the scan lines Y1 to Ym and signal lines X1 to Xn in association with the (m×n) pixel electrodes 151.

In the peripheral region 104, the array substrate 101 includes a scan line driving circuit 118 which drives the scan lines Y1 to Ym, and a signal line driving circuit 119 which drives the signal lines X1 to Xn.

Figure 3:
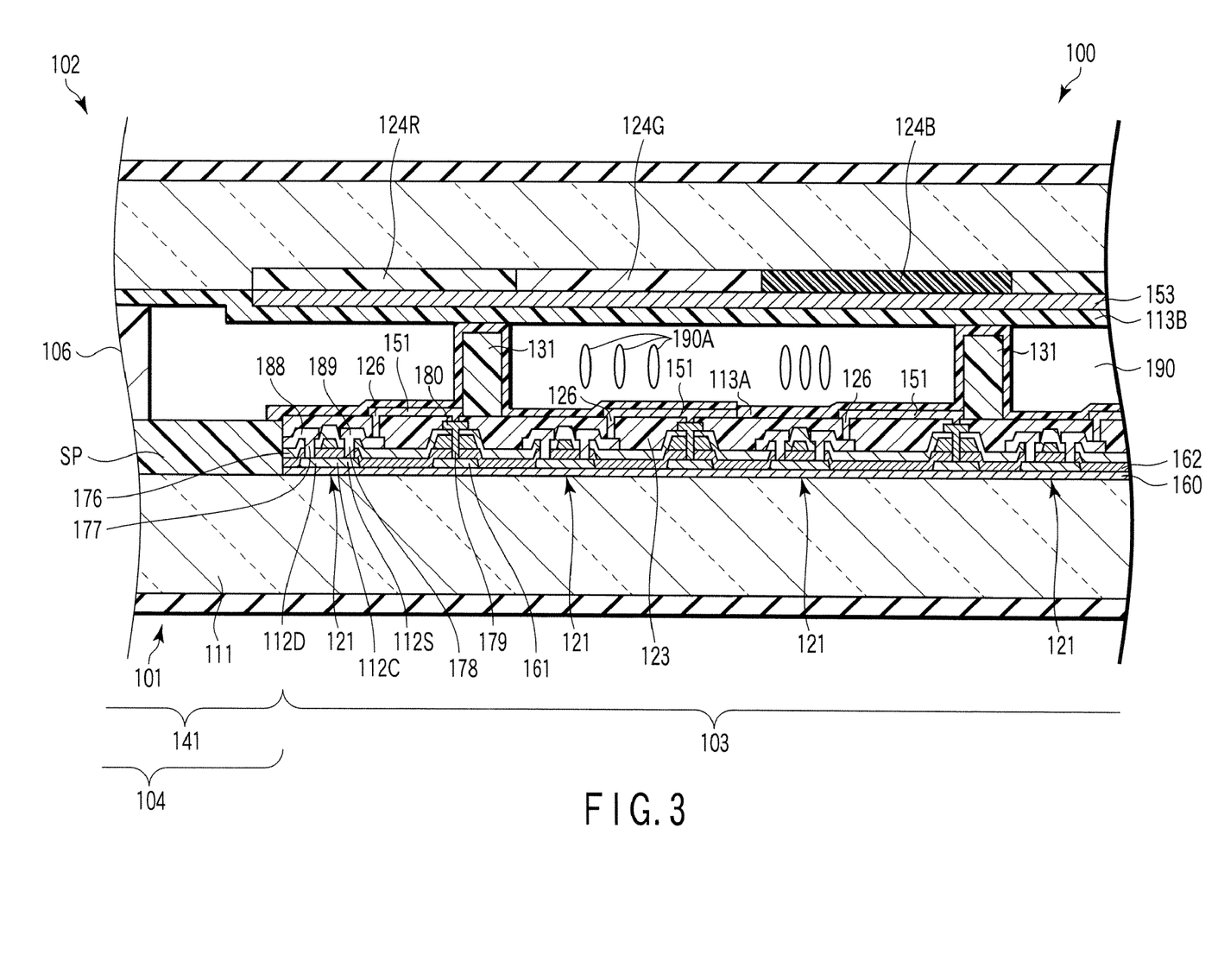
FIG. 3 is a cross-sectional view for describing the example of the structure of the liquid crystal display panel shown in FIG. 1.

As is shown in FIG. 3, in the display region 103, the array substrate 101 of the liquid crystal display panel 100 includes, on an insulating substrate 111 such as a glass substrate, switching elements, i.e. pixel TFTs 121, which are formed in association with the matrix-arrayed pixels, an insulation layer 123 which is formed to cover the display region 103 including the TFTs 121, pixel electrodes 151 which are disposed on the insulation layer 123 in association with the respective pixels, a plurality of columnar spacers 131 which are formed on the insulation layer 123, and an alignment film 113A which is formed to cover the entirety of the pixel electrodes 151. In the peripheral region 104, the array substrate 101 includes a light-blocking layer SP which is disposed in the light-blocking region 141 of the transparent substrate so as to surround the periphery of the display region 103.

The pixel electrodes 151 are formed of a light-transmissive electrically conductive material, such as ITO (Indium Tin Oxide), on the insulation layer 123. The pixel electrodes 151 are connected to the pixel TFTs 121 via through-holes 126 which penetrate the insulation layer 123. The pixel TFTs 121 are connected to the associated scan lines extending in the row direction of the pixel electrodes 151 and to the associated signal lines extending in the column direction of the pixel electrodes 151. Each pixel TFT 121 is turned on by a driving voltage supplied from the scan line, and applies a signal voltage to the associated pixel electrode 151.

The array substrate 101 includes the scan lines Y extending in the row direction of the pixel electrodes 151, the signal lines X extending in the column direction of the pixel electrodes 151, and the pixel TFTs 121 disposed near the intersections of the scan lines Y and signal lines X in association with the pixel electrodes 151.

Further, the array substrate 101 includes a storage capacitance electrode 161 for forming a storage capacitance, which has a potential equal to a potential of the pixel electrode 151 that is disposed to be opposed via a gate insulation film 162, and also includes a storage capacitance line 152 which is set at a predetermined potential.

The signal lines X are disposed to be substantially perpendicular to the scan lines Y and storage capacitance lines 152 via an interlayer insulation film 176. The storage capacitance lines 152 are formed of the same material in the same layer as the scan lines Y, and are formed substantially parallel to the scan lines Y. A part of the storage capacitance line 152 is disposed to be opposed to the storage capacitance electrode 161 via the gate insulation film 162. The storage capacitance electrode 161 is formed of an impurity-doped polysilicon film.

The wiring lines, such as the signal lines X, scan lines Y and storage capacitance lines 152, are formed of a light-blocking low-resistance material such as aluminum or molybdenum-tungsten. In this embodiment, the scan lines Y and storage capacitance lines 152 are formed of molybdenum-tungsten, and the signal lines X are mainly formed of aluminum.

The pixel TFT 121 includes a semiconductor layer 112 which is formed of a polysilicon film in the same layer as the storage capacitance electrode 161. The semiconductor layer 112 is disposed on an undercoating layer which is provided on the glass substrate. The semiconductor layer 112 includes a drain region 112D and a source region 112S, which are formed by doping impurities on both sides of a channel region 112C. The pixel TFT 121 includes a gate electrode 163 which is opposed to the semiconductor layer 112 via the gate insulation film 162 and is formed integral with the associated scan line Y.

A drain electrode 188 of the pixel TFT 121 is formed integral with the signal line X, and electrically connected to the drain region 112D of the semiconductor layer 112 via a contact hole 177 that penetrates the gate insulation film 162 and interlayer insulation film 176. A source electrode 189 of the pixel TFT 121 is formed to be electrically connected to the source region 112S of the semiconductor layer 112 via a contact hole 178 that penetrates the gate insulation film 162 and interlayer insulation film 176.

The insulation layer 123 is provided on the interlayer insulation film 176 of the array substrate 101. The pixel electrodes 151 are provided on the insulation layer 123. The pixel electrode 151 is electrically connected to the source electrode 189 of the pixel TFT 121 via a through-hole 126.

The storage capacitance electrode 161 is electrically connected to a contact electrode 180 which is formed of the same material as the signal line X via a contact hole 179 that penetrates the gate insulation film 162 and interlayer insulation film 176. Thereby, the source electrode 189 of the pixel TFT 121, the pixel electrode 151 and the storage capacitance electrode 161 are set at the same potential.

Besides, as shown in FIG. 3, the liquid crystal display panel 100 includes the columnar spacers 131 for providing a predetermined gap between the array substrate 101 and opposed substrate 102. The alignment film 113A functions to align liquid crystal molecules, which are included in the liquid crystal layer 190, in a direction substantially vertical to the array substrate 101.

The counter-substrate 102 includes color filter layers 124 (R, G, B) which are formed on a transparent insulating substrate 111 such as a glass substrate, a counter-electrode 153, and an alignment film 113B which covers the counter-electrode 153. The counter-electrode 153 is formed of a light-transmissive electrically conductive material, such as ITO, so as to be opposed to all the pixel electrodes 151 on the array substrate 101. The alignment film 113B functions to align liquid crystal molecules, which are included in the liquid crystal layer 190, in a direction substantially vertical to the counter-substrate 102.

Figure 4:
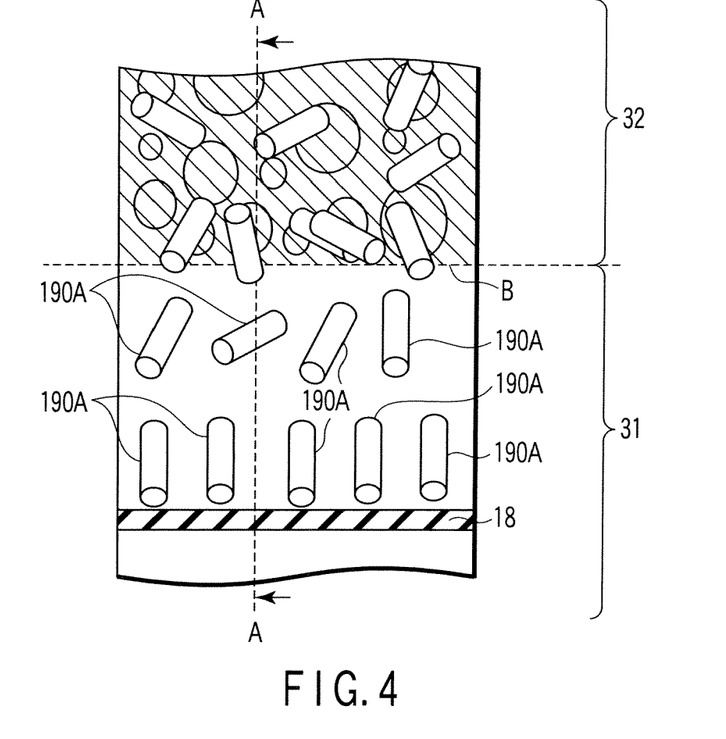
FIG. 4 is a view for describing an example of the structure of a pixel in a case where an MVA mode is applied to a transflective liquid crystal display device.
Figure 5:
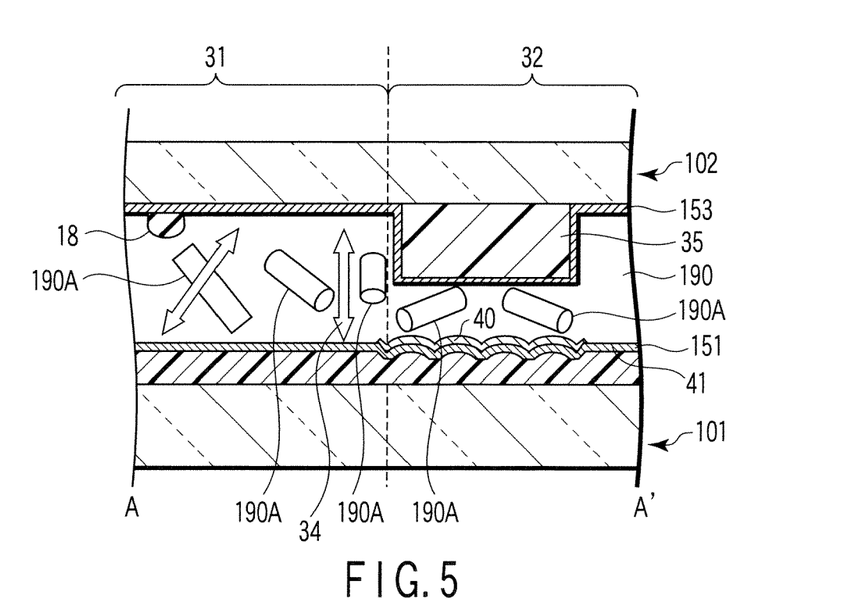
FIG. 5 is a cross-sectional view taken along line A-A' in FIG. 4, showing a transmissive display part and a reflective display part.

Next, a description is given of the pixel structure which realizes transmissive display and reflective display in the above-described liquid crystal display device. As is shown in FIG. 4 and FIG. 5, the liquid crystal layer 190 includes a transmissive display part 31 and a reflective display part 32. The pixel electrode 151 includes a transmissive electrode 41 which is disposed on the insulation layer 123, and a reflective electrode 40 which is disposed on that part of the transmissive electrode 41, which corresponds to the reflective display part 32 of the liquid crystal layer 190. The reflective electrode 40 has an uneven shape which corresponds to an uneven shape of the surfaces of the insulation layer 123 and transmissive electrode 41 provided on the insulating substrate 111.

The reflective electrode 40 is formed of a light-reflective metal material such as aluminum, and reflects light, which is incident on the reflective display part 32 from the counter-substrate 102 side, toward the counter-substrate 102. The transmissive electrode 41 is formed of a light-transmissive metal material such as ITO.

Specifically, in the reflective display part 32, the reflective electrode 40 reflects incident light from the counter-substrate 102 side towards the counter-substrate 102. In the transmissive display part 31, the transmissive electrode 41 transmits incident light from the array substrate 101 side toward the counter-substrate 102. Thereby, the liquid crystal display panel 100 realizes transmissive display and reflective display.

The counter-substrate 102 includes a transparent resin layer 35, which makes different the thickness of the liquid crystal layer 190 of the transmissive display part 31 from the thickness of the liquid crystal layer 190 of the reflective display part 32, under the counter-electrode 153 which is opposed to the reflective display part 32 of the liquid crystal layer 190. By the transparent resin layer 35, the thickness of the liquid crystal layer 190 of the reflective display part 32 is reduced to about ½ of the thickness of the liquid crystal layer 190 of the transmissive display part 31.

As shown in FIG. 4, a boundary B between the transmissive display part 31 and reflective display part 32 of the liquid crystal layer 190 extends substantially linearly in a direction which is substantially perpendicular to the longitudinal direction of the pixel electrode 151. The counter-substrate 102 includes a ridge-shaped projection 18 (dielectric element) functioning as control means for controlling an electric field which is generated in the liquid crystal layer 190. The ridge-shaped projection 18 is disposed on the counter-electrode 153 which is opposed to the transmissive display part 31 of the liquid crystal layer 190, and extends substantially in parallel with the boundary B.

If the ridge-shaped projection 18 is formed as described above, liquid crystal molecules are tilted in a fixed direction so as to align their dielectric anisotropy along lines 34 of electric force which are substantially normal to the substrate. However, in the case where the dielectric anisotropy of the liquid crystal layer 190 is negative, the azimuth direction is not determined by the lines of electric force and the direction of alignment is determined so as to minimize elastic energy of alignment. Thus, the liquid crystal is aligned along grooves of the uneven structure for diffusion reflection. As a result, the liquid crystal molecules 190A are oriented in various azimuth angles at the boundary B between the reflective display part 32 and transmissive display part 31, and a region where liquid crystal molecules are not aligned in a desired direction occurs in the transmissive display part 31.

On the other hand, the liquid crystal layer 190 can be aligned in the desired direction in the vicinity of the boundary B of the transmissive display part 31 by forming control means for making the alignment direction of liquid crystal molecules 190A, which are present near the boundary B of the reflective display part 32, substantially match the alignment direction of liquid crystal molecules 190A, which are present near the boundary B of the transmissive display part 31.

Specifically, no orientational relaxation occurs near the boundary B between the reflective display part 32 and transmissive display part 31 if the alignment direction of liquid crystal molecules 190A in the reflective display part 32 near the boundary B is made to match the alignment direction of liquid crystal molecules 190A in the transmissive display part 31 near the boundary B.

Hence, according to the present embodiment, it is possible to provide a liquid crystal display device which can have wide viewing-angle characteristics by virtue of stable domain division, can suppress a decrease in light transmissivity due to, e.g. disturbance of the alignment direction of liquid crystal molecules 190A, and can perform transmissive display and reflective display with high display quality.

Figure 6:
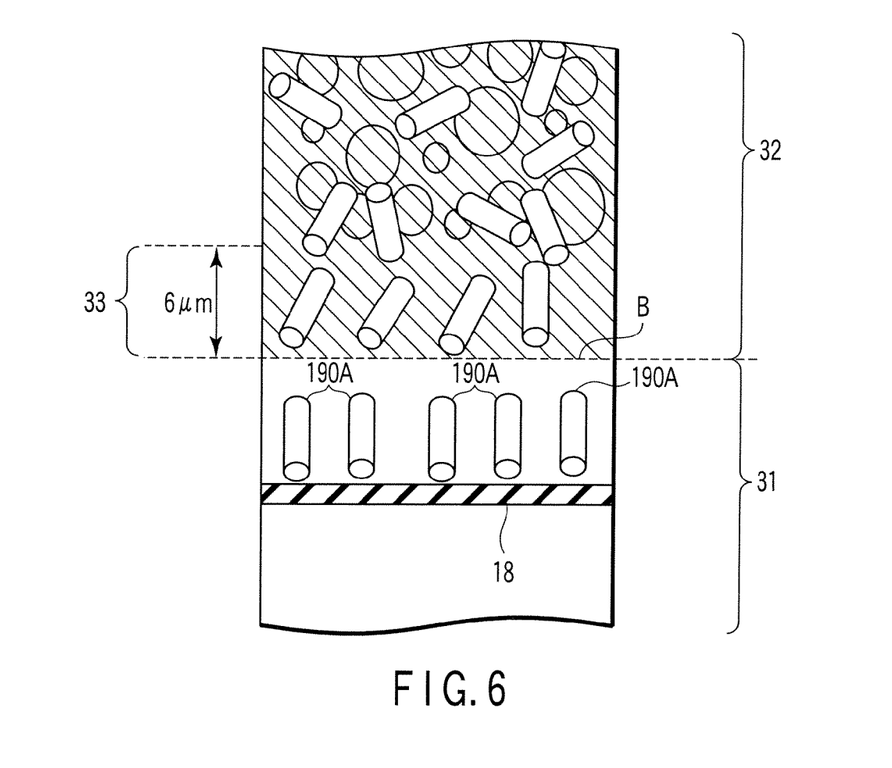
FIG. 6 is a view for describing an example of the structure of a pixel in a liquid crystal display device according to Example 1 of the present invention.

Next, preferred examples of the present invention will be described. In a liquid crystal display device according to Example 1 of the invention, as shown in FIG. 6, the counter-substrate 102 has a transparent resin layer 35, which varies the thickness of the liquid crystal layer, under the counter-electrode 153 which is opposed to the transmissive display part 31 of the liquid crystal layer 190. In this Example 1, the thickness of the transparent resin layer 35 is about 1.8 μm.

The array substrate 101, as shown in FIG. 6, includes, as control means, a planar region 33 of the pixel electrode 151 near the boundary B of the reflective display part 32. The planar region 33 of the pixel electrode 151 is provided in a range of 6 μm from the boundary B in the reflective display part 32.

The counter-substrate 102 includes, on the counter-electrode 153 opposed to the transmissive display part 31, a ridge-shaped projection 18 which extends substantially in parallel to the boundary B. In this Example 1, the thickness of the ridge-shaped projection 18 is about 1.2 μm.

The liquid crystal display panel 100 is formed by using the counter-substrate 102 and array substrate 101. An alignment film (not shown) with a thickness of 70 nm, which exhibits vertical alignment properties, was coated on the counter-substrate 102 which is opposed to the array substrate 101. Resin beads each with a diameter of 3.8 μm were used as spacers (not shown) between the array substrate 101 and counter-substrate 102. A liquid crystal material with negative dielectric anisotropy was filled in the space that is defined by the spacers between the array substrate 101 and the counter-substrate 102. Thus, a liquid crystal display panel 100 capable of effecting reflective display and transmissive display was formed.

According to the liquid crystal display device of Example 1, in the uneven structure region for diffusion reflection which is provided in the reflective display part 32, the liquid crystal molecules 190A are oriented in various directions by the excluded volume effect so as to be aligned in parallel to the grooves of the uneven structure. On the other hand, in the planar region 33 of the reflective display part 32 which is located on the transmissive display part 31 side, local deformation of the liquid crystal layer 190 relaxes so as to become minimum since the elastic energy is large, and the liquid crystal layer 190 tries to be aligned in one direction. Accordingly, the liquid crystal molecules 190A in the planar region 33 are aligned in a direction which is not contradictory to the alignment direction in the neighboring transmissive display part 31.

In particular, in order to relax local deformation, the planar region 33 with a size of about 6 μm is necessary. Thus, it should suffice if the planar region 33 with a size of about 6 μm or more, from the end of the transmissive display part 31, is provided. However, if importance is placed on the transmissive display, it is preferable to provide the planar region 33 with a size of about 10 μm. As a result, the liquid crystal can substantially be aligned in a desired direction in the transmissive display part 31.

Therefore, according to Example 1, it is possible to provide a liquid crystal display device which can have wide viewing-angle characteristics by virtue of stable domain division, can suppress a decrease in light transmissivity due to, e.g. disturbance of the alignment direction of liquid crystal molecules 190A, and can perform transmissive display and reflective display with high display quality.

Figure 10:
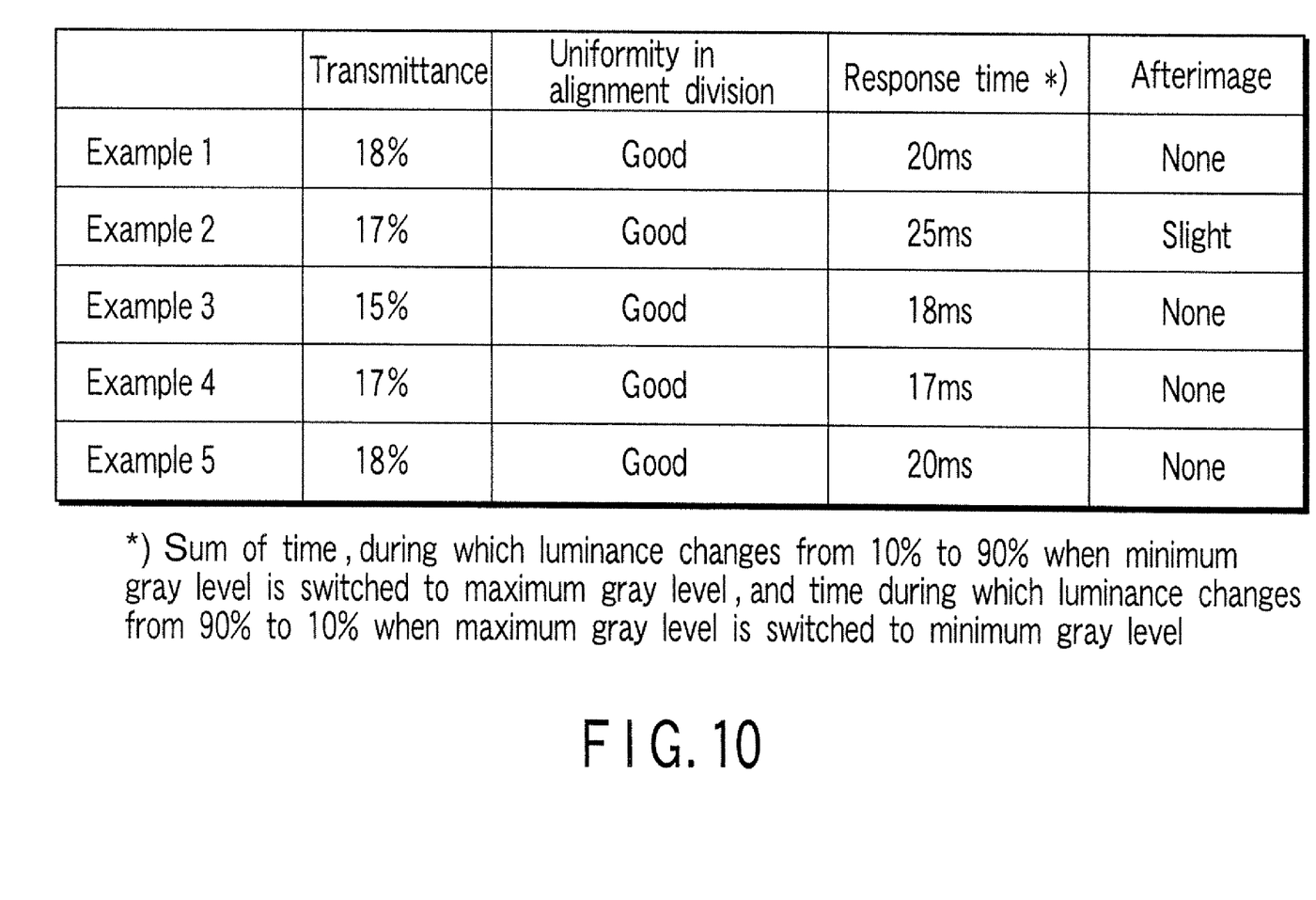
FIG. 10 is a table showing results of evaluation of the liquid crystal display devices according to Example 1 to Example 4 of the invention.

A liquid crystal display device according to the above-described Example 1 was experimentally manufactured. FIG. 10 shows an evaluation result of transmittance and response time of the manufactured liquid crystal display device.

Figure 7:
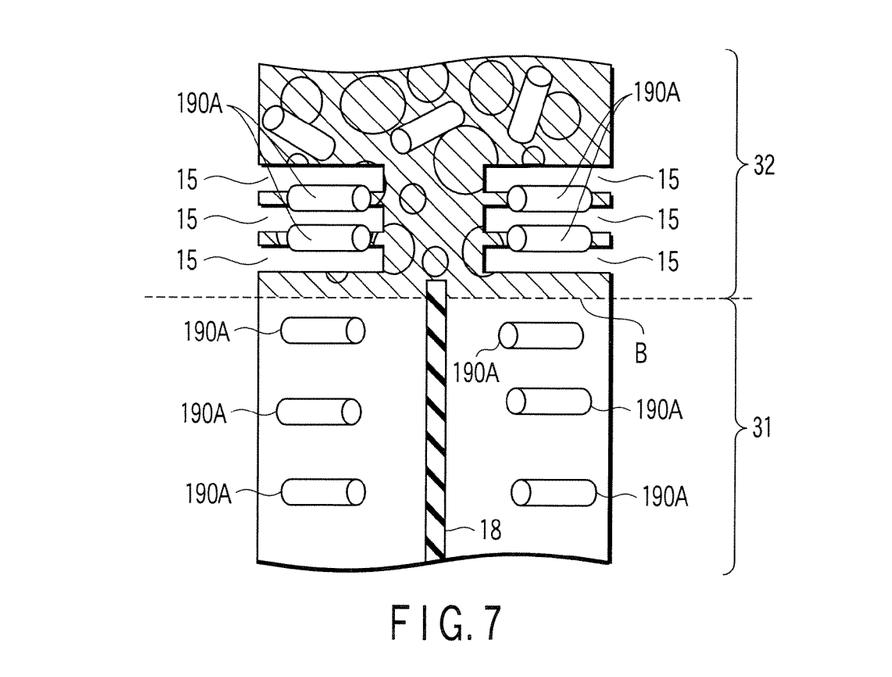
FIG. 7 is a view for describing an example of the structure of a pixel in a liquid crystal display device according to Example 2 of the present invention.

A liquid crystal display device according to Example 2 of the invention is described. As shown in FIG. 7, the array substrate 101 includes, as control means, slit parts 15 which are missing parts of the pixel electrode 151. In the reflective display part 32, the slit parts are formed at end sides extending substantially perpendicular to the boundary B and are arranged in stripes extending substantially in parallel to the boundary B.

The counter-substrate 102 includes, on the counter-electrode opposed to the transmissive display part 31, a ridge-shaped projection 18 which extends substantially perpendicular to the boundary B.

The structure of the liquid crystal display panel 100 of this Example 2 is the same as that of the liquid crystal display panel 100 of Example 1, except for the above-described pixel electrode 151 and the ridge-shaped projection 18 on the counter-electrode 153. In Example 2, the same advantageous effect as in Example 1 can be obtained. In the case where the slit parts 15 are used as control means, the slit parts 15, which are missing parts of the electrode, can be designed relatively freely within the pixel. Thereby, the preferable transmittance, response speed and viewing angle of the liquid crystal display device can be obtained relatively easily.

FIG. 10 shows an evaluation result of transmittance and response time of the liquid crystal display device including the above-described liquid crystal display panel 100.

Figure 8:
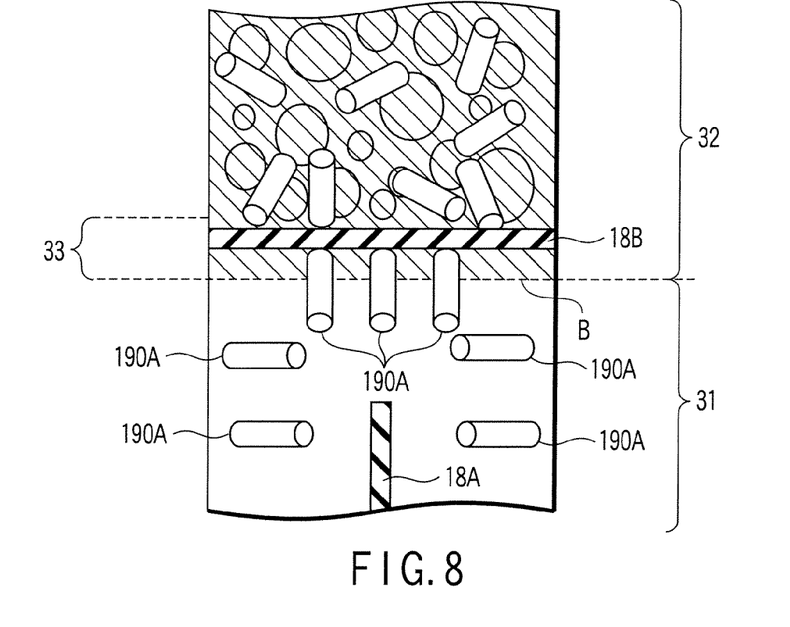
FIG. 8 is a view for describing an example of the structure of a pixel in a liquid crystal display device according to Example 3 of the present invention.

A liquid crystal display device according to Example 3 of the invention is described. As shown in FIG. 8, the counter-substrate 102 includes, as control means, a first ridge-shaped projection 18A and a second ridge-shaped projection 18B, which are provided, respectively, on the counter-electrode 153 opposed to the transmissive display part 31 and the counter-electrode 153 opposed to the reflective display part 32.

The first ridge-shaped projection 18A, which is provided on the counter-electrode 153 opposed to the transmissive display part 31, extends in a direction substantially perpendicular to the boundary B. The second ridge-shaped projection 18B, which is provided on the counter-electrode 153 opposed to the reflective display part 32, extends substantially in parallel to the boundary B.

By arranging the first ridge-shaped projection 18A and second ridge-shaped projection 18B as described above, liquid crystal molecules 190A near the boundary B are aligned substantially perpendicular to the second ridge-shaped projection 18B. Specifically, according to the liquid crystal display device of Example 3, the alignment direction of liquid crystal molecules 190A near the boundary B can be made substantially equal between the transmissive display part 31 and reflective display part 32.

The structure of the liquid crystal display panel 100 of this Example 3 is the same as that of the liquid crystal display panel 100 of Example 1, except for the above-described pixel electrode 151 and the counter-electrode 153. In Example 3, the same advantageous effect as in Example 1 can be obtained. FIG. 10 shows an evaluation result of transmittance and response time of a manufactured liquid crystal display device which was experimentally manufactured by using the above-described liquid crystal display panel 100.

Figure 9:
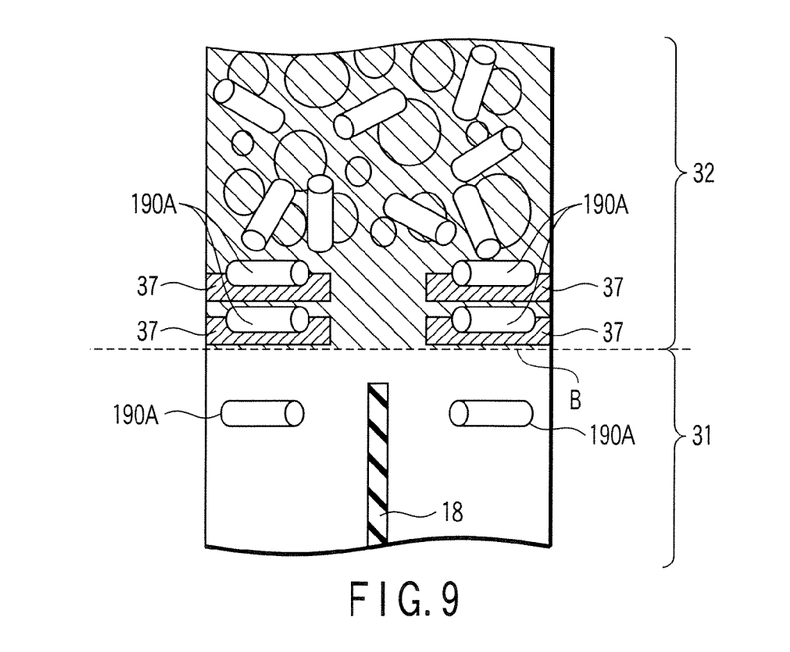
FIG. 9 is a view for describing an example of the structure of a pixel in a liquid crystal display device according to Example 4 of the present invention.

A liquid crystal display device according to Example 4 of the invention is described. As shown in FIG. 9, the array substrate 101 includes, as control means, stripe-shaped recess parts 37 which are formed on the pixel electrode 151. The recess parts 37 extend, in the reflective display part 32, substantially in parallel to the boundary B from end sides of the pixel electrode 151 which are substantially perpendicular to the boundary B between the transmissive display part 31 and reflective display part 32.

The recess parts 37 depend on the unevenness on the insulation layer 123, which is disposed as the underlayer of the pixel electrode 151. Specifically, the recess parts 37 are formed by disposing the pixel electrode 151 on the unevenness of the insulation layer 123 which is the underlayer of the pixel electrode 151. Preferably, the unevenness of the insulation layer 123 should be formed in the reflective display part 32 at the same time in the same process as the formation of the uneven structure for diffusion-reflecting the incident light from the counter-substrate 102 side. Thereby, the liquid crystal display panel 100 can be formed without increasing the number of fabrication steps.

Usable materials of the insulation layer 123 include an acrylic resin, an epoxy resin and a novolak resin. By forming the recess portions 37 at the same time as the uneven structure, it becomes possible to provide, without increasing the number of fabrication steps, a liquid crystal display device which can have wide viewing-angle characteristics by virtue of stable domain division, can suppress a decrease in light transmissivity due to, e.g. disturbance of the alignment direction of liquid crystal molecules 190A, and can perform transmissive display and reflective display with high display quality.

The counter-substrate 102 includes, on the counter-electrode 153 opposed to the transmissive display part 31, a ridge-shaped projection 18 which extends in a direction substantially perpendicular to the boundary B.

By disposing the recess portions 37 and ridge-shaped projection 18 as described above, liquid crystal molecules 190A of the reflective display part 32 and transmissive display part 31 in the vicinity of the boundary B are aligned substantially in parallel to the boundary B. In short, in the vicinity of the boundary B, the alignment directions of liquid crystal molecules 190A of the transmissive display part 31 and reflective display part 32 can be made to agree with each other.

The structure of the liquid crystal display panel 100 of this Example 4 is the same as that of the liquid crystal display panel 100 of Example 1, except for the above-described pixel electrode 151 and the counter-electrode 153. In Example 4, the same advantageous effect as in Example 1 can be obtained. FIG. 10 shows an evaluation result of transmittance and response time of a liquid crystal display device which was experimentally manufactured by using the above-described liquid crystal display panel 100.

As shown in FIG. 10, according to the invention, it is possible to provide a liquid crystal display device which has wide viewing-angle characteristics by virtue of stable domain division, has less factors of decrease in light transmittance, such as disturbance of the alignment state of liquid crystal molecules 190A, and can perform transmissive display and reflective display with high display quality.

As has been described above in detail, in the transflective liquid crystal display device, the control means for making the alignment direction of liquid crystal molecules 190A, which are present in the transmissive display part 31 side region of the reflective display part 32, match the alignment direction of liquid crystal molecules 190A in the reflective display part 32 side region of the transmissive display part 31, is disposed in the transmissive display part 31 side region of the reflective display part 32. Thereby, the liquid crystal display device, which can effect transmissive display and reflective display with high display quality, can be provided.

The present invention is not limited directly to the above-described embodiments. In practice, the structural elements can be modified without departing from the spirit of the invention.

For example, by patterning and disposing a dielectric material on the pixel electrode 151, the alignment direction of liquid crystal molecules 190A, which are present in the transmissive display part 31 side region of the reflective display part 32, can be made to match the alignment direction of liquid crystal molecules 190A in the reflective display part 32 side region of the transmissive display part 31.

In this case, for example, dielectric elements, which extend substantially in parallel to the boundary B from end sides that are substantially perpendicular to the boundary B, are disposed near the boundary B of the reflective display part 32. A ridge-shaped projection 18, which extends in a direction substantially perpendicular to the boundary B, is disposed on the counter-substrate 102 in the transmissive display part 31. Thereby, the liquid crystal molecules 190 are aligned substantially in parallel to the boundary B in the vicinity of the boundary B between the transmissive display part 31 and reflective display part 32, and the same advantages as in the above-described Examples can be obtained.

Examples of usable dielectric materials include an acrylic resin, an epoxy resin and a novolak resin, which exhibit a lower dielectric constant than the liquid crystal material. In particular, in the design with importance placed on the transmittance of the liquid crystal layer, it is preferable to use a resin material which can be subjected to microfabrication processes.

In the above-described embodiment, only the alignment films 113 are disposed on the pixel electrodes 151 and counter-electrode 153. However, depending on structures, insulation films may be disposed on these electrodes according to purposes of use. In this case, the insulation film may be formed of, e.g. an inorganic thin film of $SiO_2$, $SiN_x$, $Al_2O_3$, etc., or an organic thin film of polyimide, photoresist resin, high-polymer liquid crystal, etc.

In the case where the insulation film is an inorganic thin film, the insulation film may be formed of evaporation deposition, sputtering, CVD (Chemical Vapor Deposition) or solution coating. In the case where the insulation film is an organic thin film, a solution of organic substance or a precursor solution thereof may be coated by spinner coating, screen print coating or roll coating, and the coated film may be cured under predetermined curing conditions (e.g. heating, light radiation). Alternatively, the organic thin film may be formed by evaporation deposition, sputtering, CVD, or a LB (Langmuir-Blodgett) process.

The pixel TFT 121 may be formed by stacking a semiconductor layer of, e.g. a-Si, p-Si or ITO, and a metal layer of, e.g. Al, Mo, Cr, Cu or Ta. The intense/weak region of electric field, which functions as means for controlling the tilt of the liquid crystal molecules 190A may be formed by using ITO for forming the pixel electrode 151, or a metal wiring line (Al, Mo, Cu) for applying a signal voltage.

As regards the mode of liquid crystal, it is possible to use a liquid crystal with positive dielectric anisotropy. However, in order to effectively control the alignment direction and tilt direction by the magnitude (intense/weak) of electric field, it is most desirable to use a VAN mode in which a liquid crystal with negative dielectric anisotropy is vertically aligned. In particular, in a display device with importance placed on contrast, it is possible to design a screen with a high contrast of 500:1 or more and with a high brightness by high-transmittance design, by combining the VAN-mode normally-black setting and the orientation division state of the present invention.

Various inventions can be made by properly combining the structural elements disclosed in the embodiments. For example, some structural elements may be omitted from all the structural elements disclosed in the embodiments. Furthermore, structural elements in different embodiments may properly be combined.

For example, in the above-described embodiment and Example 2, the ridge-shaped projection 18 of the counter-substrate 102 and the slit parts 15 are provided as the control means. Alternatively, the ridge-shaped projection 18 of the counter-substrate 102 may be combined with other structural elements. The combination of the ridge-shaped projection 18 and the dielectric element on the pixel electrode 151 may be used as the control means. In these cases, too, the same advantageous effects as in the embodiment and Examples can be obtained.

In the above-described Example 2, the slit parts 15 are formed in the region where the uneven structure of the reflective display part 32 is disposed. Alternatively, the slit parts 15 may be disposed on the planar region 33 in Example 1. Thereby, it is possible to more effectively control the alignment direction of the liquid crystal molecules 190A in the vicinity of the boundary B in the reflective display part 32.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
    a first electrode substrate including pixel electrodes which are formed in association with the transmissive display part and the reflective display part;
    a second electrode substrate including a counter-electrode which is opposed to the pixel electrodes;
    a liquid crystal layer which is held between the first and second electrode substrates, and includes a transmissive display part and a reflective display part which neighbor each other via a boundary, an alignment state of liquid crystal molecules in the liquid crystal layer being controlled by an application voltage from the first and second electrode substrates in the transmissive display part and the reflective display part; and
    control means for making an alignment direction of the liquid crystal molecules, which are present near the boundary in the reflective display part, substantially match an alignment direction of the liquid crystal molecule which are present near the boundary in the transmissive display part, said control means include a dielectric element which is provided on the counter-electrode in the vicinity of the boundary and extends substantially perpendicular to the boundary and an alignment element provided on the reflective display part,
    wherein the alignment element includes a missing part which is provided on the pixel electrode and extends parallel to the boundary in the reflective display part in the vicinity of the boundary.

2. The liquid crystal display device according to claim 1, wherein the control means deforms an electric-field perpendicular to the substrates.

3. A liquid crystal display device comprising:
    a first electrode substrate including pixel electrodes which are formed in association with the transmissive display part and the reflective display part;
    a second electrode substrate including a counter-electrode which is opposed to the pixel electrodes;
    a liquid crystal layer which is held between the first and second electrode substrates, and includes a transmissive display part and a reflective display part which neighbor each other via a boundary, an alignment state of liquid crystal molecules in the liquid crystal layer being controlled by an application voltage from the first and second electrode substrates in the transmissive display part and the reflective display part; and
    control means for making an alignment direction of the liquid crystal molecules, which are present near the boundary in the reflective display part, substantially match an alignment direction of the liquid crystal molecules which are present near the boundary in the transmissive display part, said control means include a dielectric element which is provided on the counter-electrode in the vicinity of the boundary and extends substantially perpendicular to the boundary and an alignment element provided on the reflective display part,
    wherein the alignment element includes a second dielectric element which is provided on the counter-electrode in the reflective display part in the vicinity of the boundary, and
    the second dielectric element extends parallel to the boundary.

4. The liquid crystal display device according to claim 3, wherein the control means deforms an electric-field perpendicular to the substrates.

5. A liquid crystal display device comprising:
    a first electrode substrate including pixel electrodes which are formed in association with the transmissive display part and the reflective display part;
    a second electrode substrate including a counter-electrode which is opposed to the pixel electrodes;
    a liquid crystal layer which is held between the first and second electrode substrates, and includes a transmissive display part and a reflective display part which neighbor each other via a boundary, an alignment state of liquid crystal molecules in the liquid crystal layer being controlled by an application voltage from the first and second electrode substrates in the transmissive display part and the reflective display part; and
    control means for making an alignment direction of the liquid crystal molecules, which are present near the boundary in the reflective display part, substantially match an alignment direction of the liquid crystal molecules which are present near the boundary in the transmissive display part, said control means include a dielectric element which is provided on the counter-electrode in the vicinity of the boundary and extends substantially perpendicular to the boundary and an alignment element provided on the reflective display part,
    wherein the alignment element includes a recess part which is provided on the pixel electrode in the reflective display part in the vicinity of the boundary, and
    the recess part extends parallel to the boundary.

6. The liquid crystal display device according to claim 5, wherein the recess part on the pixel electrode depends on unevenness of an insulation layer which is disposed as an underlayer of the pixel electrode.

7. The liquid crystal display device according to claim 5, wherein the control means deforms an electric-field perpendicular to the substrates.

* * * * *